(12) United States Patent
Lawrence

(10) Patent No.: US 10,125,909 B2
(45) Date of Patent: Nov. 13, 2018

(54) LINER DISCHARGE STRUCTURE FOR I-LINE FITTINGS

(71) Applicant: Freedom Manufacturing LLC, Saratoga Springs, NY (US)

(72) Inventor: Jon G. Lawrence, Greenfield Center, NY (US)

(73) Assignee: Freedom Manufacturing LLC, Saratoga Springs, NY (US)

(*) Notice: Subject to any disclaimer, the term of this patent is extended or adjusted under 35 U.S.C. 154(b) by 131 days.

(21) Appl. No.: 15/295,105

(22) Filed: Oct. 17, 2016

(65) Prior Publication Data

US 2018/0106412 A1 Apr. 19, 2018

(51) Int. Cl.
*F16L 55/165* (2006.01)

(52) U.S. Cl.
CPC .................. *F16L 55/165* (2013.01)

(58) Field of Classification Search
CPC .... F16L 55/165; F16L 55/1656; B65D 25/16; B65D 77/065; B65D 88/1618
See application file for complete search history.

(56) References Cited

U.S. PATENT DOCUMENTS

| 1,452,039 | A | * | 4/1923 | Gravell | B29C 63/343 |
| | | | | | 119/203 |
| 4,635,814 | A | | 1/1987 | Jones | |
| 4,946,071 | A | * | 8/1990 | Poulton | B65B 69/0091 |
| | | | | | 141/314 |
| 4,947,988 | A | | 8/1990 | Schutz | |
| 5,385,268 | A | | 1/1995 | LaFleur et al. | |
| 5,421,370 | A | * | 6/1995 | Marcout | F16L 55/165 |
| | | | | | 138/109 |
| 5,678,688 | A | | 10/1997 | Schutz | |
| 5,794,670 | A | | 8/1998 | LaFleur | |
| 5,836,363 | A | | 11/1998 | LaFleur | |
| 5,851,072 | A | | 12/1998 | LaFleur | |
| 5,897,012 | A | | 4/1999 | Sortwell | |
| 6,009,865 | A | * | 1/2000 | Herndon | F02P 1/086 |
| | | | | | 123/601 |
| 6,244,459 | B1 | | 6/2001 | Bouc et al. | |
| 6,305,845 | B1 | | 10/2001 | Navin | |

(Continued)

*Primary Examiner* — J. Casimer Jacyna
(74) *Attorney, Agent, or Firm* — Matthew J. Kinnier; Hoffman Warnick LLC

(57) ABSTRACT

A liner discharge structure, and associated liner and container system are disclosed. A liner discharge structure according to the present disclosure can include: a neck fabricated from a liner material and shaped to extend between a container body and a pipe-fitting region; a gasket brim fabricated from the liner material and axially proximal to a circumference of the neck at the pipe-fitting region; a first disc fabricated from the liner material and axially coupled to a first surface of the gasket brim and circumferentially displaced from the neck; a second disc fabricated from the liner material and axially coupled to a second surface of the gasket brim and circumferentially displaced from the neck; and a pipe-fitting liner fabricated from the liner material circumferentially coupled to the neck, and axially proximal to the second disc on an opposing surface thereof relative to the gasket brim, wherein the pipe-fitting liner extends outwardly from a circumference of the gasket brim and the first and second discs.

20 Claims, 4 Drawing Sheets

(56) References Cited

U.S. PATENT DOCUMENTS

| | | |
|---|---|---|
| 6,505,657 B1 | 1/2003 | Lawrence |
| 7,140,490 B2 | 11/2006 | Przytulla |
| 7,296,597 B1 * | 11/2007 | Freyer ................ E21B 33/1208 |
| | | 138/89 |
| 8,715,800 B2 * | 5/2014 | Kiest, Jr. ............. F16L 55/1651 |
| | | 428/36.9 |
| 2001/0045744 A1 * | 11/2001 | Parkes ................ F16L 55/1116 |
| | | 285/55 |
| 2005/0241713 A1 * | 11/2005 | Kaneta ................ F16L 55/165 |
| | | 138/98 |

* cited by examiner

LINER DISCHARGE STRUCTURE FOR I-LINE FITTINGS

TECHNICAL FIELD

The subject matter of the present disclosure relates to container liners, and more particularly to a liner discharge structure adapted for use with I-line fittings.

BACKGROUND

Bulk containers, including tanks and totes, are used in many applications to hold and ship fluids. Illustrative fluids may for example include industrial liquids, such as chemicals and paints, as well as consumer products such as lotions and other beauty products. Regardless, in many applications, a key challenge is the need to avoid or eliminate contamination stemming from contact with foreign substances, e.g., portions of the container. For instance, some chemical food products or similar chemicals may become unsuitable for human consumption after being exposed to contaminants, e.g., within the container and/or included within the material composition of the container. As a result of these concerns, governmental agencies such as the Food and Drug Administration (FDA) have set stringent standards for liquid and non-liquid products stored in containers that are to be consumed or applied to people.

In some applications, a disposable single-use or multi-use liner can be installed within a container to reduce or eliminate contamination. For example, U.S. Pat. No. 6,505,657, entitled "Container Liners and Methods of Lining Containers," issued on Jan. 14, 2003, the contents of which is hereby incorporated by reference, teaches a liner system for use with tanks, such as an intermediate bulk container (IBC). In such an application, the liner can be shaped to conform to the inner surface of the container, so as to not interfere with any product contained therein.

While the use of liners greatly enhances the performance, lifespan and usability of a container, liners present various challenges. One such challenge is the need to ensure that the liner is easy to install and does not interfere with the operation of the container. For example, some containers may include a discharge opening at the bottom for discharging fluids through a valve. Under certain circumstances, the liner could slip within the tank and interfere with the opening. Another challenge is the need to ensure that the liner material is compatible with the particular fluids being held therein.

Still other containers may include mechanical couplings which may interfere with the use of a conventional liner, e.g., I-line fittings which incorporate direct flat-faced connections between two pieces of metal pipe, which may be held together by fasteners. I-Line fittings are typically found, e.g., in containers for bakery, beverage, cosmetic, dairy, and food substances in which sanitary conditions are required. I-line fittings may be structured to include a plastic for providing additional fluid sealing between the two piping materials. I-Line fittings are typically designed to withstand high pressures, mechanical vibration, and/or high temperatures in the discharge structure. Even where conventional liners are operable for use in containers with varying discharge fittings, mechanical shocks and/or other types of interference may pose a risk of leakage and backflow between the liner material and the discharge opening.

SUMMARY

A first aspect of the present disclosure provides a liner discharge structure adapted for an I-line pipe-fitting, the liner discharge structure including: a neck fabricated from a liner material and shaped to extend between a container body and a pipe-fitting region; a gasket brim fabricated from the liner material and axially proximal to a circumference of the neck at the pipe-fitting region; a first disc fabricated from the liner material and axially coupled to a first surface of the gasket brim and circumferentially displaced from the neck; a second disc fabricated from the liner material and axially coupled to a second surface of the gasket brim and circumferentially displaced from the neck; and a pipe-fitting liner fabricated from the liner material circumferentially coupled to the neck, and axially proximal to the second disc on an opposing surface thereof relative to the gasket brim, wherein the pipe-fitting liner extends outwardly from a circumference of the gasket brim and the first and second discs.

A second aspect of the present disclosure provides a liner for a container, comprising: a liner body shaped and adapted to conform to an inner wall of the container, wherein the liner body is fabricated from a liner material; and a liner discharge structure attached to a liner opening in the liner body, the liner discharge structure including: a neck fabricated from a liner material and shaped to extend between a container body and a pipe-fitting region; a gasket brim fabricated from the liner material and axially proximal to a circumference of the neck at the pipe-fitting region; a first disc fabricated from the liner material and axially coupled to a first surface of the gasket brim and circumferentially displaced from the neck; a second disc fabricated from the liner material and axially coupled to a second surface of the gasket brim and circumferentially displaced from the neck; and a pipe-fitting liner fabricated from the liner material circumferentially coupled to the neck, and axially proximal to the second disc on an opposing surface thereof relative to the gasket brim, wherein the pipe-fitting liner extends outwardly from a circumference of the gasket brim and the first and second discs.

A third aspect of the present disclosure provides: a container system, including: a container having a discharge spout; and a liner positioned within the container and including: a liner body shaped and adapted to conform to an inner wall of the container, wherein the liner body is fabricated from a liner material, and a liner discharge structure attached to a liner opening in the liner body, the liner discharge structure including: a neck fabricated from a liner material and shaped to extend between a container body and a pipe-fitting region; a gasket brim fabricated from the liner material and axially proximal to a circumference of the neck at the pipe-fitting region; a first disc fabricated from the liner material and axially coupled to a first surface of the gasket brim and circumferentially displaced from the neck; a second disc fabricated from the liner material and axially coupled to a second surface of the gasket brim and circumferentially displaced from the neck; and a pipe-fitting liner fabricated from the liner material circumferentially coupled to the neck, and axially proximal to the second disc on an opposing surface thereof relative to the gasket brim, wherein the pipe-fitting liner extends outwardly from a circumference of the gasket brim and the first and second discs.

BRIEF DESCRIPTION OF THE DRAWINGS

These and other features of this invention will be more readily understood from the following detailed description of the various aspects of the invention taken in conjunction with the accompanying drawings in which.

Figure 1:
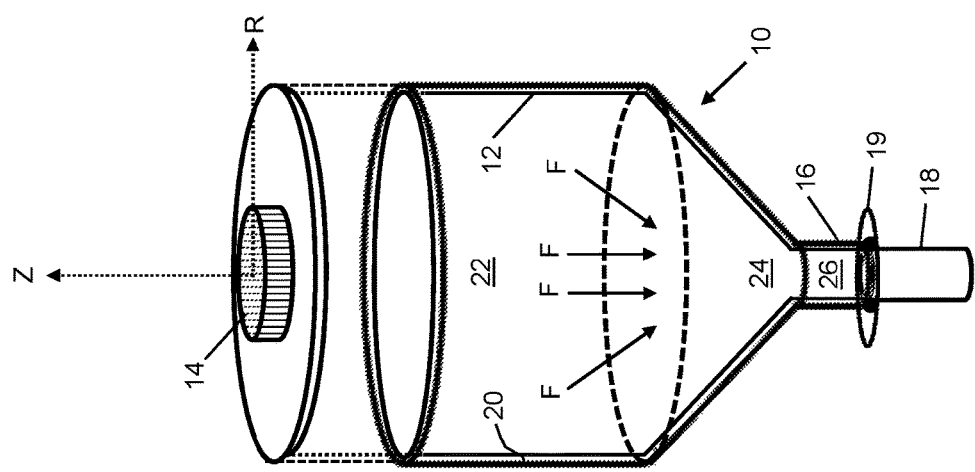
FIG. 1 shows a container having a liner with a liner discharge structure adapted for an I-line pipe-fitting according to embodiments of the present disclosure.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments of the present disclosure provide a liner discharge structure adapted for an I-line pipe-fitting, as well as a liner for a container and a container system which include embodiments of the liner discharge structure discussed herein. A liner discharge structure according to the present disclosure can include a neck fabricated from a liner material, and shaped to extend between a body of a container and a pipe-fitting region. As described herein, a "pipe-fitting region" refers to a portion of the discharge structure adapted for placement within container discharge outlet. The container discharge outlet, in turn, may be shaped or otherwise mechanically configured for attachment to a pipe for transmitting materials from the container. Pipe-fitting regions according to the present disclosure, more specifically, can include an I-line pipe-fitting in which a mechanical fastener (e.g., a clamp) secures a pipe to the discharge structure of the container, such that the pipe axially and circumferentially contacts the discharge structure. Embodiments of the present disclosure may include a set of components adapted to serve as, or otherwise replace, a gasket between the discharge spout and pipe as may be applicable to conventional couplings without a liner therein. In some cases, the neck may be composed of a corrugated material to resist collapse of the liner within the discharge structure as materials flow therethrough.

The liner discharge structure can include a gasket brim, which may be positioned axially proximal to the neck at the pipe-fitting region of the discharge structure. In some embodiments, the gasket brim may be bonded or otherwise coupled to the circumferential exterior of the neck. A first disc may be axially coupled to a first surface of the gasket brim, and circumferentially displaced from the neck such that a gap separates the first disc from the neck. In addition, a second can be axially coupled to a second surface of the gasket brim and circumferentially displaced from the neck, such that a gap also separates the neck from the second disc. The liner discharge structure may also include a pipe-fitting liner. The gasket brim, first and second discs, and pipe-fitting liner may be fabricated from a single liner material, e.g., the same material used to form the neck or other portions of the container liner. The pipe-fitting liner may be circumferentially coupled to the neck and axially coupled to the second disc on an opposite surface relative to the gasket brim. The pipe-fitting liner can extend outwardly from a circumference of the gasket brim, the first disc, and the second disc, such that the pipe-fitting liner may occupy a contact area between the container discharge and a pipe mechanically coupled thereto.

Referring to FIG. 1, an illustrative container 10 generally includes an inner wall 12, a filling port 14 and a discharge spout 16. Container 10 can be of any size, and more specifically can be provided with any conceivable height and/or length dimension as indicated with partial phantom lines. For the purposes of this disclosure, the term container may refer to any tank, tote, vessel, etc., that is capable of storing fluids. Further, such containers may be fabricated from any material, including plastics (e.g., PVC, HDPe, etc.), metal, composites, etc. Discharge spout 16 can be coupled to a pipe 18, e.g., through an I-line connection or other mechanical coupling for connecting pipe 18 to discharge spout 16 from container 10. In some cases, as discussed elsewhere herein, pipe 18 can be mechanically fastened to discharge spout 16 through a fastener 19 (e.g., a clamp, a buckle, a rivet, etc.) mounted circumferentially about discharge spout 16 and pipe 18. Container 10 may include other components (e.g., valves) within discharge spout 16 and/or pipe 18 for controlling an amount of fluid discharge from container 10. Container 10 can be positioned within an external structure (not shown) such as a frame, fixture, etc., for maintaining a desired position and/or orientation of container 10 and components thereof during use. Although discharge spout 16 and pipe 18 are shown by example as having a vertical orientation, discharge spout 16 and/or pipe 18 may extend horizontally relative to container 12 in alternative embodiments.

As shown, container 10 can include a liner 20 therein having a liner body 22, a narrowing region 24 (distinguished from liner body 22 by dashed lines), and a liner discharge structure 26, such that a portion of liner 20 is seated at least within discharge spout 16. Container 10 and liner 20 can extend substantially along an axial axis "Z," with a radial axis "R" extending outwardly therefrom. Liner body 22 can be shaped and adapted to conform to inner wall 12 during operation, e.g., by being manufactured with substantially the same size, shape, etc., as container 10 where liner 20 is used. Liner body 22 can have a first cross-sectional area, which may gradually decrease through narrowing region 24. The cross-sectional area of liner 20 may be smallest at liner discharge structure 26, as shown. Thus, narrowing region 24 may have a gradually tapered cross-sectional area between liner body 22 and discharge structure 26. The cross-sectional area of liner 20 at liner discharge structure 26 be reduced relative to the cross-sectional area of liner 20 within liner body 22 by a predetermined factor, e.g., by an approximately 1:2, 1:4, 1:10 area ratio or by any other desired ratio between cross-sectional areas. Narrowing region 24 can thus have a distinct shape from liner discharge structure 26 and liner 20, and in an example embodiment can make up at least a partially frusto-conical region of liner 20. In any event, the size of liner 20 can vary during manufacture based on the size of container 10 where liner 20 is used, as indicated with the corresponding phantom lines. Embodiments of the present disclosure can include features of liner discharge structure 26 at discharge spout 16 to aid, e.g., the discharge flow of chemicals from container 10 while preventing fluid backflow between discharge spout 16 and liner discharger structure 26, slipping or other dislocations of liner 20 from container 10, and/or other operational problems.

Although liner 20 is shown as being separated from inner wall 12, discharge spout 16, etc., in FIG. 1 for ease of description, it is understood that liner 20 and components thereof can structurally conform to the dimensions of container 10 using known techniques. For example, where liner 20 is composed of a pliable material such as a polymer compound, the various components of liner 20 will not noticeably consume any of the volume of container 10. For example, liner 20 may have a thickness of less than approximately five millimeters (mm) and thereby cause no interference with the operation of container 10.

Each subcomponent or sub-section of liner 20, including liner body 22, narrowing section 24, and/or liner discharge structure 26 described herein can be fabricated from the same material or group of materials, such that the complete material composition of liner 20 is non-contaminating relative to materials therein and/or the structure of container 10. One or more of the materials used to form liner 20 can be selected to provide physical engagement, attachment, attraction, etc., between container 10 and liner 20 pursuant to any currently-known or later-developed technique for physically engaging two materials together. In an example embodiment, liner 20 can be composed of a multilayer substrate having properties compatible with the fluid within container 10. Accordingly, selection of the liner material may change based on the intended application. Generally, the same liner material can be used for liner body 22, narrowing section 24, and liner discharge structure 26 to ensure a homogeneous containment environment.

Figure 2:
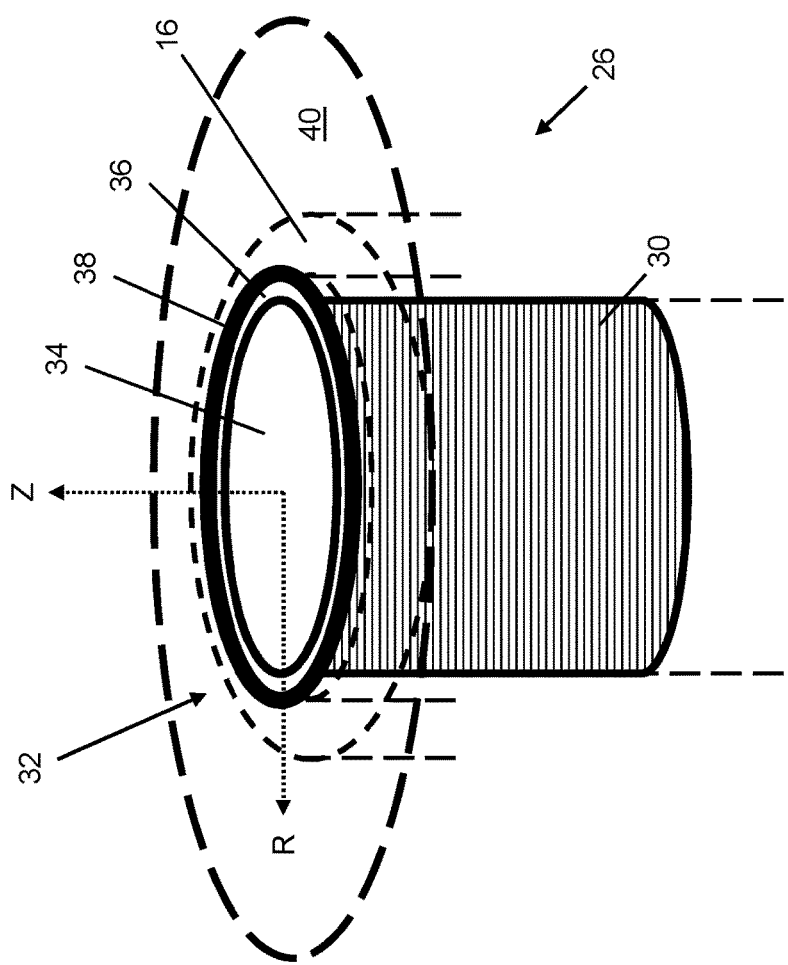
FIG. 2 provides a perspective view of a discharge structure adapted for an I-line fitting according to embodiments of the present disclosure.

Referring to FIG. 2, a detailed view of liner discharge structure 26 for integration into liner 20 of container 10 is provided. As discussed herein, liner discharge structure 26 can be fabricated separately from liner body 22 (FIG. 1), thereafter being attached to an opening in liner body 22 using any technique that does not introduce any foreign material, e.g., heat sealing, vibration welding, ultrasonic welding, etc. In an example embodiment, liner discharge structure 26 may include a neck 30 which may be composed of a polymerous material (e.g., polyethylene) processed into the form of a non-slit corrugated loom tube. In further embodiments, neck 30 can be fabricated, e.g., in a substantially tubular arrangement from one or more sections of liner material that is welded along one or more seams (not shown). Neck 30 may be shown in the accompanying FIGS. as including or not including a corrugated exterior, and it is understood that neck 30 may include a variety of exterior surface profiles, features, etc. Neck 30 can be fabricated to include a corrugated exterior surface to provide mechanical resistance against collapse within discharge spout 16 as fluids from container 10 (FIG. 1) pass therethrough, and create a pressure differential between container 10 and neck 30. Where neck 30 includes a corrugated structure, as depicted in FIG. 2, the exterior surface profile of neck 30 can create a water-tight seal between neck 30 of discharge structure 26 and discharge spout 16. Neck 30, as a result of the compositional and manufacturing attributes described herein, can have a substantially cylindrical shape to thereby provide a fluid passageway between opposing ends of liner discharge structure 26, and to provide other operational features.

Figure 4:
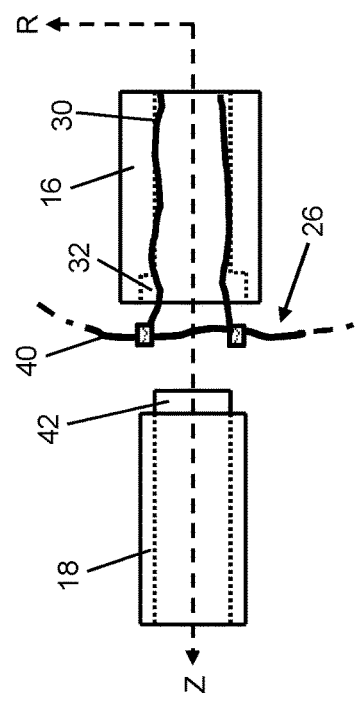
FIG. 4 shows a discharge spout and discharge structure aligned for engagement with a pipe according to embodiments of the present disclosure.
Figure 5:
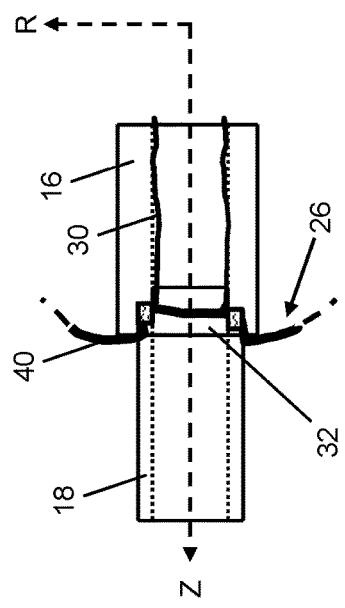
FIG. 5 shows a liner discharge structure positioned between a pipe and engaged discharge spout according to embodiments of the present disclosure.
Figure 6:
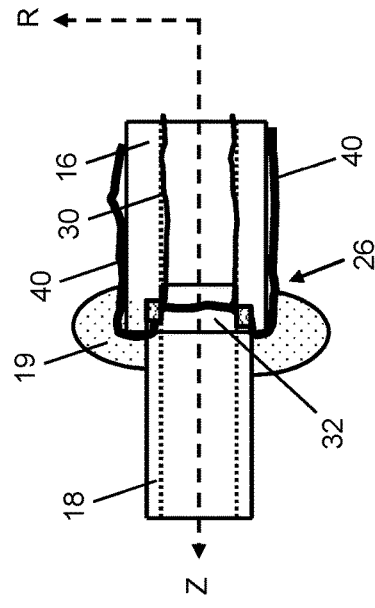
FIG. 6 shows a liner discharge structure positioned between a pipe fastened to discharge spout according to embodiments of the present disclosure.

A pipe-fitting region 32 of discharge spout 16 may provide a junction for axially connecting pipe 18 (FIG. 1) thereto. More specifically, pipe-fitting region 32 can be shaped for use within an I-line pipe-fitting. As discussed elsewhere herein, an I-line pipe-fitting refers to a junction between two fluid-transmitting pipes in which the two pipes axially and circumferentially contact each other, e.g., to form a metal-to-metal connection. An I-line pipe-fitting may lack any direct mechanical couplings (e.g., complementarily threaded surfaces) for joining the pipes together, and may be structurally supported by fastener 19 (FIG. 1) or similar elements. I-line pipe fittings, or simply "I-line fittings," may be adapted for the installation of a gasket between the connected portions of pipe, e.g., in the form of a structure shaped similarly to the interior of pipe 18. Embodiments of the present disclosure can include features for replacing a conventional gasket in an I-line pipe fitting as discussed in further detail elsewhere herein. Mechanical engagement between discharge spout 16 and pipe 18 at pipe fitting region 32, with discharge structure 26 included, is shown in FIGS. 4-6 and described in further detail elsewhere herein.

Neck 30 can be less flexible than the material composition of liner 20 (FIG. 1) yet may retain sufficient flexibility to be temporarily bent, deformed, rotated, shrunk, or otherwise physically adapted to pass through discharge spout 16 during installation of liner 20. Thus, the entire surface area of liner discharge structure 26, including the various subcomponents discussed elsewhere herein, can be chemically homogeneous with liner 20 so as to ensure compatibility with the fluids contained therein. The use of chemically homogeneous materials throughout liner discharge structure 26 also allows for simplified manufacturing, i.e., reducing the number of technical challenges associated with welding or sealing various materials together.

Figure 3:
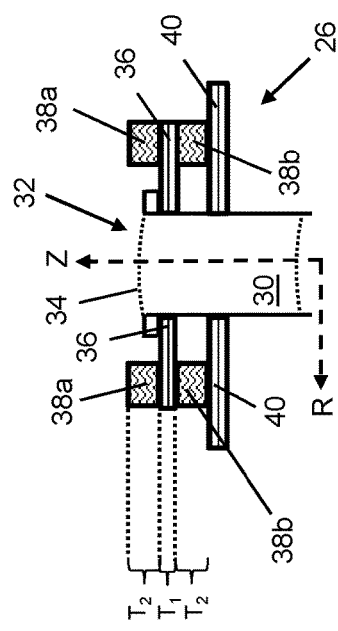
FIG. 3 shows a cross-sectional view of a discharge structure according to embodiments of the present disclosure.

Referring to FIGS. 2-3 together, discharge structure 26 can include an axial opening 34, about which a gasket brim 36 may be proximal to and circumferentially aligned with to neck 30. In some embodiments, gasket brim 36 may be thermally bonded and/or otherwise mechanically coupled to an axial end of neck 30 in pipe fitting region 32. In other embodiments, gasket brim 36 may be positioned in contact with an axial end or axially terminal portion of neck 30 without being structurally coupled thereto. Although neck 30 may have a corrugated surface profile as described elsewhere herein, neck 30 is shown without such corrugation in FIG. 3 for clarity relative to other elements of discharge structure 26. Gasket brim 36 may be composed of one or more liner materials, e.g., the same material as neck 30 and/or a different liner material. According to some embodiments, gasket brim 36 may be composed of multiple layers of liner material thermally bonded together to provide increased stiffness and size relative to a single layer, and in an example embodiment may include three film layers bonded together. Gasket brim 36 may have a cross-sectional thickness $T_1$ (FIG. 3 only) proportionate to the number of bonded layers therein. Gasket brim 36 may be positioned proximal to pipe-fitting region 32, e.g., at an axial end of neck 30. By extending radially outward from neck 30 (e.g., along radial direction R), gasket brim 36 can be shaped to contact an axial surface area within an I-line fitting to provide a seal against product backflow between discharge structure 26 and discharge spout 16.

According to an example process, gasket brim 36 may be formed by stacking multiple layers of liner film material on top of each other. The stacked layers can then be bonded together as a mold by applying pressure and heat to the stack of layers. The bonded layers of film may then be formed into the structure of gasket brim 36, e.g., by die-cutting the molded structure into a shape which conforms to the shape and contour of neck 30, discharge spout 16, etc. According to an embodiment, the thickness of gasket brim 36 may be no larger than the distance between successive corrugation ribs of neck 30, where applicable. Axial opening 34 may be formed, e.g., by cutting away an interior portion of the bonded film layers. Gasket brim 36 may in turn be bonded to the exterior surface of neck 30 by melting one or more ribs positioned proximal to gasket brim 36 to create a water-tight seal between gasket brim 36 and neck 30.

A set of discs 38 may be axially coupled to opposing surfaces of gasket brim 36 to provide increased mechanical stiffness at the circumferential periphery of gasket brim 36. Each disc 38 may have a radial width less than that of gasket brim 36 such that discs 38 are circumferentially displaced from the outer surface of neck 30, yet mechanically coupled thereto through gasket brim 36. As shown in FIG. 3, a first disc 38a can be axially bonded and/or otherwise coupled to an axial surface of gasket brim 36, while a second disc 38b can be axially bonded and/or otherwise coupled to an opposing axial surface of gasket brim 36. First and second discs 38a, 38b may have a rounded shape extending into and out of the plane of the page in FIG. 3, e.g., as shown in FIG. 2. Each disc 38a, 38b may be composed of the same or different liner materials as compared to neck 30 and gasket brim 36, and in an embodiment may include multiple thermally bonded layers of film, axially layered adjacent to each other. When discs 38a, 38b are thermally bonded to opposing surfaces of gasket brim 36, gasket brim 36 in turn may be thermally bonded to neck 30 along its inner circumference in addition to being thermally bonded to discs 38a, 38b along its periphery.

During manufacture, discs 38a, 38b may be bonded and/or otherwise structurally coupled to respective portions of gasket brim 36 before gasket brim is positioned proximal to neck 30. For example, discs 38a, 38b may be thermally bonded to opposing surfaces of liner material before the liner material is die cut to form the shape and size of gasket brim 36. Gasket brim 36 can be formed by the use of a cutting fixture shaped to form gasket brim 36 with the desired shape and dimensions, or can be formed by one or more machines, processes, etc., for die cutting a material into a desired shape. In any event, the total thickness of discs 38a, 38b and gasket brim 36 therebetween (e.g., the sum of $T_1+T_2+T_2$) may be greater than a separation distance between adjacent corrugated ribs of neck 30, where included or applicable. However embodied, discs 38a, 38b may be sized to be at least as thick as a conventional gasket positioned within pipe-fitting region 32 when gasket brim 36 is bonded therebetween. The gap between discs 38a, 38b and neck 30 may serve to allow gasket brim 36 to fit between successive corrugated ribs of neck 30 (where applicable) and maintain a fluid-tight seal after neck 30 is positioned proximal to, and/or coupled with gasket brim 36.

However embodied, a cross-sectional thickness $T_2$ (FIG. 3 only) of first and second discs may be greater than cross-sectional thickness $T_1$ of gasket brim 36. According to one embodiment, each disc 38 may include about eight layers of film thermally bonded together such that the thickness and stiffness of each disc 38a, 38b is greater than gasket brim 36. In any case, the number of film layers in each disc 38a, 38b may be greater than the number of thermally bonded layers in gasket brim 36, e.g., by having eight layers in each disc 38a, 38b as compared to three layers in gasket brim 36. The larger cross-sectional thickness of discs 38 relative to gasket brim 36 can provide greater mechanical stability and increased seal strength at the outer periphery of gasket brim 36, and can also provide an outer contact region between discharge spout 16 and discharge structure 26.

Discharge structure 26 can also include a pipe-fitting liner 40 fabricated from, e.g., the same liner material used for neck 30, gasket brim 36, discs 38, and/or other portions of liner 20 (FIG. 1). Pipe-fitting liner 40 may be circumferentially coupled to neck 30, e.g., by being thermally bonded to its exterior surface as discussed elsewhere herein relative to gasket brim 36. Pipe-fitting liner thus may be axially displaced from gasket brim 36, with second disc 38b being positioned therebetween. Pipe-fitting liner 40 may extend outwardly along radial axis R from the outer circumference of gasket brim 36 and discs 38. Thus, pipe-fitting liner 40 may occupy a greater surface area than neck 30, gasket brim 36, and discs 38 in order to be positioned throughout an entire I-line pipe-fitting between discharge spout 16 and pipe 18 (FIG. 1). Pipe-fitting liner 40 may include one or more thermally bonded layers of film, as discussed elsewhere herein relative to gasket brim 36. In an example, pipe-fitting liner 40 may include a single layer of liner material film such that pipe-fitting liner 40 has a lower cross-sectional thickness than gasket brim 36 and discs 38. However embodied, pipe-fitting liner may be thermally bonded to neck 30 at its outer surface in addition to being thermally bonded to second disc 38b along an opposing side thereof relative to gasket brim 36.

As noted herein, the particular size and configuration of the liner discharge structure 26 is dependent upon the features of each container 10 (FIG. 1) where it will be used. For example, in some instances, discharge spout 16 may be oriented partially or completely axially downward (i.e., along the same direction as gravitational force) from the bottom of a cone-shaped container, creating a potential for liner 20 (FIG. 1), discharge structure 26, and/or components thereof to slide downward from any direction. Moreover, although specific shapes are discussed herein, liner discharge structure 26 and/or other portions of liner 20 could be fashioned in a variety of forms, e.g., conical, rounded, etc., to conform with inner wall 12 proximate discharge spout 16.

Turning to FIG. 4, embodiments of discharge structure 26 may be used, and can remain in place, as discharge spout 16 is mechanically coupled to pipe 18. Other features of discharge structure 26 are omitted from FIGS. 4-6 or shown in a simplified form for simplicity of illustration. Pipe 18 may include an axial fitting 42 shaped to mechanically engage pipe-fitting region 32 of discharge spout 16. Axial fitting 42 is shown by example as being in the form of an axial protrusion from pipe 18, it is understood that axial fitting 42 may alternatively be in the form of a recess engaged by a protrusion included with pipe-fitting region 32. Neck 30 of discharge structure 26 may extend axially through pipe-fitting region 32, with pipe-fitting liner 40 extending circumferentially outward from neck 30 as described elsewhere herein. Before discharge structure 26 and discharge spout 16 engage pipe 18, discharge spout 16 may be axially aligned with pipe 18, as shown.

Turning to FIG. 5, discharge structure 26 may be axially interposed between discharge spout 16 and pipe 18 during mechanical engagement therebetween. As shown, neck 30 can circumferentially engage an interior surface of discharge spout 18, with other elements of discharge structure 26, e.g., gasket brim 36 (FIGS. 2-3), discs 38 (FIGS. 2-3), contacting discharge spout 16 proximal to pipe-fitting region 32. Pipe-fitting liner 40 can extend outwardly from pipe-fitting region 32, as described elsewhere herein, such that pipe-fitting liner 40 is interposed between metal-to-metal contact surfaces of discharge spout 16 and pipe 18. The position of pipe-fitting liner 40 axially between discharge spout 16 and pipe 18 can prevent backflow of liquids behind discharge structure 26

(e.g., by flowing around gasket brim 36 and discs 38), and can maintain the seal structure between discharge spout 16 and pipe 18 at pipe-fitting region 32.

Turning to FIG. 6, fastener 19 can be secured to discharge spout 16 and pipe 18 such that fastener 19 contacts pipe-fitting liner 40. Thus, a portion of pipe-fitting liner 40 may be positioned outside the contact area between discharge spout 16 and pipe 18, as shown. Fluids exiting container 10 (FIG. 1) through discharge spout 16 may therefore pass through neck 30 before reaching pipe 18, which may or may not include its own liner therein, without leaking through the seal between discharge spout 16 and pipe 18. The presence of pipe-fitting liner 40 may also prevent leakage between discharge spout 16 and pipe 18 while fastener 19 remains in place. Discharge structure 26 can therefore enable or facilitate the use of container liners in containers 10 designed to include an I-line pipe fitting at their discharge spout(s), and without encumbering the passage of fluids therethrough.

Embodiments of the present disclosure can provide several technical and commercial advantages, some of which are discussed by example herein. For example, some types of containers such as "intermediate bulk containers" (IBCs) may be adapted for use with one or more contaminant-sensitive materials, e.g., cosmetic products, food products, etc. Generally, embodiments of the present disclosure can be fabricated from materials which are compatible with the material contents stored therein, e.g., by including one or more films of polymerous material. Further, the shape and design of discharge structures according to the present disclosure can accommodate dimensional variations between different I-line fittings.

Embodiments of the present disclosure can also prevent any leakage from the I-line fitting from leaking behind the discharge structure and passing between the discharge spout and the liner structure. Embodiments of the present disclosure can be easily coupled to existing liner discharge structures without causing residual materials to contaminate the liner and/or any materials therein. The material composition and relative position of liner discharge structures described herein may also be unaffected by metal contact from a discharge spout and pipe mechanically coupled thereto, even when such components are fastened together by external elements (e.g., one or more clamps). Discharge structures according to the present disclosure may also incorporate the use of structures (e.g., first and second discs) which may supplant the use of a gasket within the pipe-fitting region, and/or provide a new gasket design which is particularly effective when used with container liners.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A liner discharge structure adapted for an Mine pipe-fitting, the liner discharge structure comprising:
    a neck fabricated from a liner material and shaped to extend between a container body and a pipe-fitting region;
    a gasket brim fabricated from the liner material and coupled to a circumference of the neck at the pipe-fitting region;
    a first disc fabricated from the liner material and axially coupled to a first surface of the gasket brim and circumferentially displaced from the neck;
    a second disc fabricated from the liner material and axially coupled to a second surface of the gasket brim and circumferentially displaced from the neck; and
    a pipe-fitting liner fabricated from the liner material circumferentially coupled to the neck, and coupled to the second disc on an opposing surface thereof relative to the gasket brim, wherein a circumference of the pipe-fitting liner is greater than a circumference of the neck, the gasket brim and the first and second discs.

2. The liner discharge structure of claim 1, wherein the first disc has a greater cross-sectional thickness than the gasket brim.

3. The liner discharge structure of claim 2, wherein the second disc has a greater cross-sectional thickness than the gasket brim.

4. The liner discharge structure of claim 1, wherein a cross-sectional area of the pipe-fitting liner is greater than a cross-sectional area of the pipe-fitting region.

5. The liner discharge structure of claim 1, wherein the gasket brim is thermally bonded to each of the neck and the first and second discs.

6. The liner discharge structure of claim 5, wherein the pipe-fitting liner is thermally bonded to each of the neck and the second disc.

7. The liner discharge structure of claim 1, wherein the gasket brim, the pipe-fitting liner, and the first and second discs each include a plurality of molded film layers, and wherein an amount of molded film layers in the first and second discs is greater than an amount of molded film layers in the gasket brim and the pipe-fitting liner.

8. A liner for a container, comprising:
    a liner body shaped and adapted to conform to an inner wall of the container, wherein the liner body is fabricated from a liner material; and
    a liner discharge structure attached to a liner opening in the liner body, the liner discharge structure including:
        a neck fabricated from a liner material and shaped to extend between the liner body and a pipe-fitting region;
        a gasket brim fabricated from the liner material and coupled to a circumference of the neck at the pipe-fitting region,
        a first disc fabricated from the liner material and axially coupled to a first surface of the gasket brim and circumferentially displaced from the neck,
        a second disc fabricated from the liner material and axially coupled to a second surface of the gasket brim and circumferentially displaced from the neck, and
        a pipe-fitting liner fabricated from the liner material circumferentially coupled to the neck, and coupled to the second disc on an opposing surface thereof relative to the gasket brim, wherein a circumference of the pipe-fitting is greater than a circumference of the neck, the gasket brim, and the first and second discs.

9. The liner of claim 8, wherein the first disc has a greater cross-sectional thickness than the gasket brim.

10. The liner of claim 9, wherein the second disc has a greater cross-sectional thickness than the gasket brim.

11. The liner of claim 8, wherein a cross-sectional area of the pipe-fitting liner is greater than a cross-sectional area of the pipe-fitting region.

12. The liner of claim 8, wherein the gasket brim is thermally bonded to each of the neck and the first and second discs.

13. The liner of claim 12, wherein the pipe-fitting liner is thermally bonded to each of the neck and the second disc.

14. The liner of claim 8, wherein the gasket brim, the pipe-fitting liner, and the first and second discs each include a plurality of molded film layers, and wherein an amount of molded film layers in the first and second discs is greater than an amount of molded film layers in the gasket brim and the pipe-fitting liner.

15. A container system, comprising:
a container having a discharge spout; and
a liner positioned within the container and including:
    a liner body shaped and adapted to conform to an inner wall of the container, wherein the liner body is fabricated from a liner material, and
    a liner discharge structure attached to a liner opening in the liner body, the liner discharge structure including:
        a neck fabricated from a liner material and shaped to extend between a container body and an end of the discharge spout;
        a gasket brim fabricated from the liner material and coupled to a circumference of the neck at the pipe-fitting region,
        a first disc fabricated from the liner material and axially coupled to a first surface of the gasket brim and circumferentially displaced from the neck,
        a second disc fabricated from the liner material and axially coupled to a second surface of the gasket brim and circumferentially displaced from the neck, and
        a pipe-fitting liner fabricated from the liner material circumferentially coupled to the neck, and coupled to the second disc on an opposing surface thereof relative to the gasket brim, wherein the pipe-fitting liner extends outwardly from a circumference of the gasket brim and the first and second discs.

16. The container system of claim 15, wherein the first and second discs each have a greater cross-sectional thickness than the gasket brim.

17. The container system of claim 15, wherein a cross-sectional area of the pipe-fitting liner is greater than a cross-sectional area of the pipe-fitting region.

18. The container system of claim 15, wherein the gasket brim is thermally bonded to each of the neck and the first and second discs.

19. The container system of claim 18, wherein the pipe-fitting liner is thermally bonded to each of the neck and the second disc.

20. The container system of claim 15, wherein the gasket brim, the pipe-fitting liner, and the first and second discs each include a plurality of molded film layers, and wherein an amount of molded film layers in the first and second discs is greater than an amount of molded film layers in the gasket brim and the pipe-fitting liner.

* * * * *